United States Patent [19]

Doe, Jr.

[11] Patent Number: 4,711,915

[45] Date of Patent: Dec. 8, 1987

[54] SURFACE COATING COMPOSITIONS CONTAINING SUBSTITUTED 1,3,4-THIADIAZOLES

[75] Inventor: Lester A. Doe, Jr., Newtown, Conn.

[73] Assignee: R. T. Vanderbilt Company, Inc., Norwalk, Conn.

[21] Appl. No.: 848,535

[22] Filed: Apr. 7, 1986

[51] Int. Cl.$^4$ .................. C08K 5/46; C07D 285/12; C09D 5/14

[52] U.S. Cl. ...................... 523/122; 524/83; 524/84; 548/142; 106/18.33; 424/78; 424/81

[58] Field of Search .......... 523/122; 548/142; 524/83, 84; 106/16, 18.33; 424/28, 81

[56] References Cited

U.S. PATENT DOCUMENTS

| | | | |
|---|---|---|---|
| 2,736,729 | 2/1956 | Krzikallo et al. | 524/83 |
| 3,888,869 | 6/1975 | Pews et al. | 260/302 SD |
| 4,209,522 | 6/1980 | Mixan et al. | 424/270 |

FOREIGN PATENT DOCUMENTS 1128134  4/1962  Fed. Rep. of Germany ........ 524/83
2459672  3/1975  Fed. Rep. of Germany .

OTHER PUBLICATIONS

Pianka, J. Sci. Fd. Agric., vol. 19, pp. 502–507, Sep. 1968.

*Primary Examiner*—Wilbert J. Briggs, Sr.
*Assistant Examiner*—David W. Woodward
*Attorney, Agent, or Firm*—Rasma B. Balodis

[57] ABSTRACT

Surface coating compositions having improved resistance to attack by fungi and other microorganisms contain a biocidally effective amount of an antimicrobially active compound having the structural formula

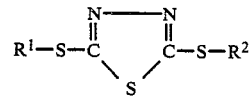

wherein $R^1$ and $R^2$ each represent an alkyl group having 1–8 carbon atoms.

5 Claims, No Drawings

SURFACE COATING COMPOSITIONS CONTAINING SUBSTITUTED 1,3,4-THIADIAZOLES

BACKGROUND OF THE INVENTION

The invention relates to surface coating compositions having improved resistance to deterioration resulting from attack by microorganisms. More particularly, it relates to surface coating compositions that contain a biocidally effective amount of a substituted 1,3,4-thiadiazole.

It is well known that organic surface coatings such as paints, stains, and varnishes are susceptible to attack by microorganisms. Such attack causes discoloration, blemish and disfiguration on the surface of the dried coating and ultimate loss of adhesion of the coating to the substrate. This deteriorating effect is commonly known as mold or mildew growth.

Several fungi, yeasts, algae, and bacterial species are known to cause mold growth on exterior coatings. Most frequently found fungus colonies on painted surfaces are Aeruobasidium species. Secondary causes of discoloration are Alternaria, Cladosporium and Penicillium species in warm, humid regions and Aspergillus species in northern climates. To be useful as a mold inhibitor, the biocide must meet a number of criteria. The biocide must possess antimicrobial properties. The biocide must be compatible with the coating medium and retain its activity in the container during the normal storage life and in the dried coating during the service life of the coating.

The mere fact that a chemical compound is known to possess fungicidal activity does not mean that it will be effective in inhibiting mold growth on exterior coating surfaces for long periods of time. In fact, most known fungicides are not useful for protecting exterior coatings. Many fungicides lose their fungicidal activity prior to being applied in a dried film form. Other fungicides may prevent deterioration by anaerobic microorganisms in a sealed can, but fail to prevent the formation of mold or mildew by aerobic microorganisms on a surface exposed to ambient air. The biological activity of many chemical compounds is impaired by the weathering environment to which most exterior coatings are exposed.

Other chemical and physical properties influence the activity of the fungicide such as solubility, dispersibility, film permeability, volatility and odor. In the dried coating, a mold inhibitor must retain its activity and remain effective under the influence of detrimental atmospheric conditions such as ultraviolet radiation and pollution, particularly sulfur type effluents. The inhibitor must remain in the coating without leaching out or evaporating to the atmosphere. For optimum effectiveness, the mold inhibitor must be uniformly distributed throughout the coating, that is, it must migrate throughout the film and may not concentrate in any one stratum of the coating.

Prior art references have suggested the use of several 1,3,4-thiadiazole compounds as paint fungicides and bactericides. Thus, U.S. Pat. No. 3,888,869 discloses thiocyanatoalkythio derivatives of 1,3,4-thiadiazole and U.S. Pat. No. 4,209,522 5-nitro-2-thiazolythio derivatives of 1,3,4-thiadiazole. However, none have proven entirely satisfactory for commercial applications.

Unexpectedly, it has been found that certain alkylthio derivatives of 1,3,4-thiadiazole satisfy the criteria for application in surface coatings and are highly effective in inhibiting mold growth on paint coatings.

SUMMARY OF THE INVENTION

According to the invention, there are provided 1,3,4-thiadiazole derivatives possessing antimicrobial properties against the growth of fungi and other microorganisms on the surface of protective coatings and having the structural formula

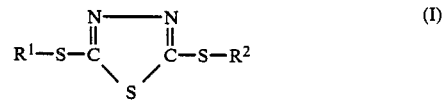

wherein $R^1$ and $R^2$ each represent an alkyl group having 1 to 8 carbon atoms.

Another object of the invention is to provide paint compositions containing antimicrobially active 1,3,4-thiadiazole compounds of the structural formula (I).

A further object is the process to protect surface coatings against mold growth by incorporating into the coating formulation 1,3,4-thiadiazole compounds of the formula (I).

DESCRIPTION OF THE PREFERRED EMBODIMENTS

The alkylthio derivatives of the invention may be prepared by reacting 2,5-dimercapto-1,3,4-thiadiazole with the corresponding alkyl halide in the presence of a base by known methods as, for example, described by M. Pianka, J. Sci, Fd. Agric., vol 19, p. 502, September 1968. Preferably the reaction is conducted in an organic solvent media. Other methods of synthesis may be used.

The substituent groups $R^1$ and $R^2$ in formula (I) may be the same or different. The $R^1$ and $R^2$ groups represent an alkyl group having a straight chain and preferably 1 to 8 carbon atoms. These include, among others, methyl, ethyl, propyl, n-butyl, pentyl, and n-octyl.

In a preferred embodiment of the invention, the antimicrobial compounds may be used to impart resistance to fungi and other microorganisms to a wide variety of surface coatings including both organic solvent-thinned and water-thinned paints that contain about 10 to 60 percent by weight of a water-insoluble, film-forming binder. The surface coating compositions of this invention exhibit long-term resistance to attack by microorganisms irrespective of whether in solution or applied as a dry coating.

The organic solvent-thinned paints are based on an oleo-resinous binder. Suitable oleoresinous binder include drying oils, such as linseed oil, dehydrated castor oil, tung oil, soybean oil, safflower oil or fish oil; bodied drying oils; blends of drying oils or bodied drying oils with a resin component such as limed rosin, an ester gum or phenolic resin; oleoresinous varnishes formed by heating one of the hereinabove described resins with one or more drying oils or bodied drying oils; alkyd resins prepared by the reaction of a polyhydric alcohol, such as pentaerythritol or glycerol, with a dicarboxylic acid, such as phthalic anhydride, and fatty acids; and mixtures thereof.

The water-thinned paints may contain an oleoresinous binder as hereinbefore defined and/or a synthetic linear addition binder. The useful aqueous dispersions of addition polymers are ordinarily prepared by the emulsion polymerization of ethylenically unsaturated monomers. Illustrative of the addition polymer binders are acrylic resins, butadiene-styrene copolymers, butadiene-acrylonitrile copolymers, polyethylene, polyisobutylene, polystyrene, vinyl polymers such as polyvinyl acetate, polyvinyl butyrate, polyvinyl chloride and their copolymers with other vinyl monomers, acrylonitrile and acrylic acid esters, polyurethanes, epoxides and other conventional film forming bases.

In addition to the resinous binder and the antimicrobial compound, the surface coating compositions may contain various auxiliary materials, such as pigments, extenders, fillers, thickeners, driers, plasticizers, wetting agents, emulsifying agents, freeze-thaw stabilizers, other biocides, solvents, and the like in the amounts ordinarily used for these purposes.

The concentrations of the mold inhibitor in the paint is not narrowly critical. An effective concentration may range from about 0.1 to 5 weight percent based on the weight of the paint composition or 0.1 to 10 weight percent based on the weight of the paint solids. The preferred range is 0.5 to 2.0 weight percent based on the weight of the paint composition. The compounds of the invention may be incorporated into the paint formulations by conventional techniques.

The following examples are illustrative of the effectiveness of the present compounds in surface coatings. The ingredients used in the examples are commercial materials and are identified by the following tradenames and/or trademarks: "DARVAN", "NYTAL", and "RHEOTOL" of the R. T. Vanderbilt Company, Inc.; "Cellosize" of the Union Carbide Corporation; "Triton" of the Rohm and Haas Company; "Nopco" of the Diamond Shamrock Corporation; and "Exkin" of Nuodex, Inc.

EXAMPLE I

Exterior acrylic latex paint was prepared by blending together at two different speeds the following ingredients in the amounts indicated.

| Exterior Acrylic Latex Paint Formulation | |
|---|---|
| Ingredients | Kg |
| High Speed Dispersion | |
| Hydroxyethylcellulose (2.5% Cellosize QP-15000 Gel) | 38.64 |
| Water | 28.41 |
| Polyelectrolyte Dispersing Agent (DARVAN No. 7) | 4.77 |
| Wetting Agent (Triton CF-100) | 1.14 |
| Potassium tripolyphosphate | 0.68 |
| Defoamer (Nopco NXZ) | 0.45 |
| Ethylene glycol | 11.36 |
| Rutile Titanium Dioxide | 113.64 |
| Talc (NYTAL 200) | 95.45 |
| Slow Speed Reduction | |
| Acrylic latex | 209.09 |
| Defoamer (Nopco NXZ) | 0.45 |
| Tributyl phosphate | 5.00 |
| Propylene glycol | 15.45 |
| Ammonium hydroxide | 0.45 |
| Water | 14.09 |

Liquid mold inhibitors were added directly to the finished paint, whereas solid inhibitors were mulled into propylene glycol and then incorporated into the finished paint. In some instances it was necessary to dissolve solid compounds in a suitable solvent, because coarseness prevented the preparation of a concentrated dispersion. A control containing no mold inhibitor was included for comparison.

The test paints were allowed to age four weeks at 25° C. before preparation of exposure panels. The panels were prepared by applying two brush coats of each test paint to tongue depressor panels (1.9×15.2 cm) previously painted with one coat of a primer based on Federal Specification TT-P-25d and containing no mold inhibitor. One or two days were allowed before applying the second coat of test paint. The panels were mounted vertically on wood frames and exposed outdoors facing south in Louisiana.

After exposure for a period of six months, the test samples were rated on the following scale:
10=no mildew growth
8=slight growth
6=considerable growth
4=heavy growth
2=very heavy growth
0=extreme growth
The results are compiled in Table I.

TABLE I

| Outdoor Exposure of Acrylic Paint | | |
|---|---|---|
| Mold Inhibitor | Percent Based On Paint Weight | Mold Growth After 6 Months |
| None | — | 5 |
| 2,5-Bis(butylthio)-1,3,4-thiadiazole | 0.5 | 8 |
| 2,5-Bis(butylthio)-1,3,4-thiadiazole | 1.0 | 9 |
| 2,5-Bis(butylthio)-1,3,4-thiadiazole | 2.0 | 10 |
| 2,5-Bis(methylthio)-1,3,4-thiadiazole | 2.0 | 7 |
| 2,5-Bis(ethylthio)-1,3,4-thiadiazole | 2.0 | 7 |
| 2,5-Bis(propylthio)-1,3,4-thiadiazole | 2.0 | 7 |
| 2,5-Bis(pentylthio)-1,3,4-thiadiazole | 2.0 | 8 |
| 2,5-Bis(octylthio)-1,3,4-thiadiazole | 2.0 | 8 |

EXAMPLE II

Exterior alkyd paint was prepared by mixing together the following ingredients in the amounts indicated.

| Exterior Alkyd Paint Formulation | |
|---|---|
| Components | Kg |
| Titanium dioxide | 146.62 |
| Talc (NYTAL 300) | 171.07 |
| Alkyd resin | 171.07 |
| Zinc naphthenate | 2.45 |
| Calcium naphthenate | 5.40 |
| Cobalt naphthenate | 1.00 |
| Butyraldoxime Anti-Skin Agent (Exkin No. 1) | 1.00 |
| Polymerized alkyl phosphate Flow Agent (RHEOTOL) | 2.95 |
| Mineral Spirits | 74.29 |

Mold inhibitors were added to the paint and the paint was aged for 4 weeks at 25° C. Mold growth was evaluated as described in Example I. A control containing no mold inhibitor was used for comparison.

The test data illustrates the excellent protection against mold growth on the surfaces of paint coatings as evidenced in Table II. Activity was retained after testing under conditions simulating long-storage and exposure.

TABLE II

| Outdoor Exposure of Alkyd Paint | | |
|---|---|---|
| Mold Inhibitor | Percent Based On Paint Weight | Mold Growth After 6 Months |
| None | — | 3 |
| 2,5-Bis(propylthio)-1,3,4-thiadiazole | 2.0 | 6 |
| 2,5-Bis(butylthio)-1,3,4-thiadiazole | 2.0 | 8 |
| 2,5-Bis(pentylthio)-1,3,4-thiadiazole | 2.0 | 8 |

The above embodiments have shown the preferred aspects of the present invention. Other variations will be evident to those skilled in the art. Such modifications are intended to be within the scope of the invention as defined by the appended claims.

What is claimed is:

1. An improved surface coating composition comprising a binder selected from the group consisting of alkyd resins and acrylic resins, and about 0.1 to 5.0 percent by weight of the composition of an antimicrobially active compound having the structural formula

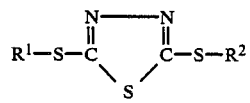

wherein $R^1$ and $R^2$ each represent an alkyl group having 1 to 8 carbon atoms to inhibit the growth of microorganisms on the dry film formed from said coating composition.

2. A coating composition according to claim 1 wherein the antimicrobially active compound is 2,5-bis(butylthio)-1,3,4-thiadiazole.

3. A coating composition according to claim 1 wherein the antimicrobially active compound is 2,5-bis(pentylthio)-1,3,4-thiadiazole.

4. A method for controlling mold growth on a surface coating composition comprising a film forming binder selected from a group consisting of alkyd resins and acrylic resins, that comprises incorporating in said composition about 0.1 to 5.0 percent by weight, based on the weight of the composition, of an antimicrobially active compound having the structural formula

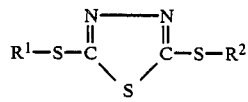

wherein $R^1$ and $R^2$ each represent an alkyl group having 1 to 8 carbon atoms.

5. A method according to claim 4 wherein the antimicrobially active compound is 2,5-bis(butylthio)-1,3,4-thiadiazole.

* * * * *